(12) United States Patent
Trivedi et al.

(10) Patent No.: US 7,431,907 B2
(45) Date of Patent: Oct. 7, 2008

(54) APPARATUS FOR REMOVING VAPORIZED UNREACTED ISOCYANATE FROM A GASEOUS WASTE STREAM

(75) Inventors: Yogesh C. Trivedi, Grosse lle, MI (US); Theodore M. Smiecinski, Woodhaven, MI (US)

(73) Assignee: BASF Corporation, Florham Park, NJ (US)

( * ) Notice: Subject to any disclaimer, the term of this patent is extended or adjusted under 35 U.S.C. 154(b) by 377 days.

(21) Appl. No.: 11/276,706

(22) Filed: Mar. 10, 2006

(65) Prior Publication Data

US 2007/0212270 A1    Sep. 13, 2007

(51) Int. Cl.
*B01D 53/54* (2006.01)
*B01D 53/74* (2006.01)

(52) U.S. Cl. .................. 423/236; 422/105; 422/108; 422/131; 422/168; 422/177; 422/180

(58) Field of Classification Search ............... 422/105, 422/108, 131, 168, 177, 180; 423/236
See application file for complete search history.

(56) References Cited

U.S. PATENT DOCUMENTS 4,585,625 A * 4/1986 Chadwick et al. ........... 423/236
5,078,980 A * 1/1992 Mullner et al. .............. 423/236

* cited by examiner

*Primary Examiner*—Timothy C Vanoy

(57) ABSTRACT

An apparatus includes a container that defines an interior. The interior is isolated from ambient atmosphere for receiving a composition that includes isocyanate. A conduit extends into the container and defines a channel therethrough. An interior of the container is in fluid communication with the ambient atmosphere through the channel for conveying a gaseous waste stream that includes vaporized unreacted isocyanate out of the container and into the ambient atmosphere. A medium is disposed in the channel and has free isocyanate-reactive groups for reacting with unreacted isocyanate. The free isocyanate-reactive groups remove the unreacted isocyanate from the gaseous waste stream. The medium, by including the free isocyanate-reactive groups, relies on a chemical reaction to remove the unreacted isocyanate.

32 Claims, 4 Drawing Sheets

APPARATUS FOR REMOVING VAPORIZED UNREACTED ISOCYANATE FROM A GASEOUS WASTE STREAM

BACKGROUND OF THE INVENTION

1. Field of the Invention

The subject invention generally relates to an apparatus that is equipped to remove unreacted isocyanate from a gaseous waste stream and a method of removing the isocyanate from the gaseous waste stream. More specifically, the subject invention relates to an apparatus that has a medium for removing the unreacted isocyanate from the gaseous waste stream.

2. Description of the Related Art

Many processes involve the use of isocyanate. One of the most prevalent processes that involves the use of isocyanate is the production of polyurethane. For the production of polyurethane, an apparatus is provided that includes a mold for receiving a composition that includes the isocyanate. In addition to the isocyanate, the composition includes another component that is reactive with the isocyanate component, such as a polyol or polyamine, to form the polyurethane. One of the problems in the production of polyurethane from the composition including the isocyanate is that unreacted isocyanate is a highly volatile chemical and readily vaporizes from the composition. The EPA has environmental regulations that stipulate a rate at which isocyanate can be released into ambient atmosphere. For this reason, the unreacted isocyanate that has vaporized from the composition is typically contained within an area around the mold in the apparatus to prevent the unreacted isocyanate from escaping into the ambient atmosphere. The unreacted isocyanate is gathered as part of a gaseous waste stream. The unreacted isocyanate, among other components, is removed from the gaseous waste stream with a medium before the gaseous waste stream is discharged into the ambient atmosphere.

A typical medium that is used for removing the unreacted isocyanate from the gaseous waste stream is an activated carbon bed. Activated carbon beds are effective for removing the unreacted isocyanate from the gaseous waste stream; however, the activated carbon beds have many disadvantages. For example, activated carbon beds function by adsorbing the gaseous waste stream, with components in the gaseous waste stream sticking to the activated carbon. To adsorb the gaseous waste stream, the gaseous waste stream is forced through the activated carbon bed, which provides a porous matrix, at high pressure. A pressure drop across the activated carbon bed is often substantial, i.e., pressure drops of about 12 inches of water column are not uncommon. Higher pressure drop correlates to increased cost of producing the polyurethane since excessive amounts of energy are required to force the gaseous waste stream through the activated carbon bed. Furthermore, the activated carbon beds are extremely heavy and bulky, which limits process design. The activated carbon beds are also difficult to operate and require extensive maintenance. Other media used to remove the unreacted isocyanate and the other components have similar drawbacks.

Due to the deficiencies of the current media used to remove unreacted isocyanate from the gaseous waste stream, there remains an opportunity to provide an apparatus including a medium and a method of removing unreacted isocyanate from a gaseous waste stream without the drawbacks of the activated carbon bed in order to allow for greater flexibility in process design. There is also an opportunity to provide an apparatus including a media and a method of removing unreacted isocyanate from a gaseous waste stream that is easier to operate and that does not require extensive maintenance, as compared to the current media used to remove unreacted isocyanate from gaseous waste streams. Further, there is an opportunity to provide an apparatus including a medium and a method of removing the isocyanate from the gaseous waste stream that exhibits a lower pressure drop than currently achieved with the activated carbon beds to improve process efficiency and reduce energy that is required to force the gaseous waste stream through the medium, while removing comparable amounts of the unreacted isocyanate from the gaseous waste stream.

SUMMARY OF THE INVENTION AND ADVANTAGES

The subject invention provides an apparatus including a container that defines an interior. The interior is isolated from ambient atmosphere. A conduit extends into the container and defines a channel therethrough. An interior of the container is in fluid communication with the ambient atmosphere through the channel. A medium is disposed in the channel. The medium includes the reaction product of an isocyanate component and an isocyanate-reactive component. The medium has free isocyanate-reactive groups for reacting with vaporized unreacted isocyanate. The free isocyanate-reactive groups remove the vaporized unreacted isocyanate from the gaseous waste stream.

A method of removing vaporized unreacted isocyanate from a gaseous stream includes the steps of providing the gaseous waste stream that includes the vaporized unreacted isocyanate in the container and directing the gaseous waste stream including the vaporized unreacted isocyanate from the gaseous waste stream through the medium. The vaporized unreacted isocyanate and the free isocyanate-reactive groups are reacted to produce a gaseous product stream that is substantially free of unreacted isocyanate. The gaseous product stream that is substantially free of unreacted isocyanate is then discharged.

The apparatus and method of removing unreacted isocyanate from the gaseous stream eliminate the drawbacks of the activated carbon bed and allow for greater flexibility in process design. More specifically, the medium, by including the free isocyanate-reactive groups, relies on a chemical reaction to remove the vaporized unreacted isocyanate, rather than mere adsorbing. As a result, process conditions necessary for adsorbing, such as high pressures and pressure drops, are unnecessary and process efficiency is improved over activated carbon beds since less energy is required to remove comparable amounts of the vaporized unreacted isocyanate from the gaseous waste stream. Furthermore, the free isocyanate-reactive groups may be included on various materials that are lighter and less bulky than the activated carbon beds to allow for greater freedom in process design. Also due to the ability to use materials that are light and less bulky than the activated carbon beds, the apparatus including the media is easier to operate and that does not require extensive maintenance that is required of the activated carbon beds.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE PREFERRED EMBODIMENT

Figure 1:
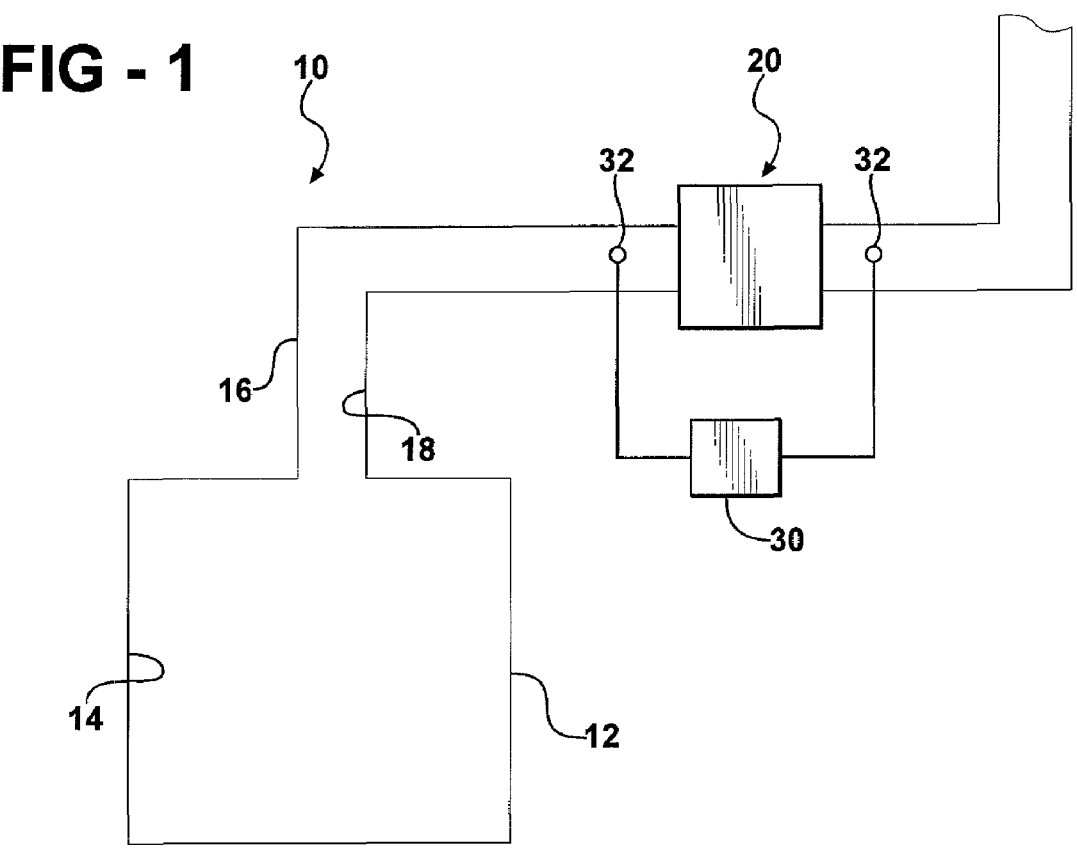
FIG. 1 is a schematic view of an apparatus of the subject invention that is equipped to remove vaporized unreacted isocyanate from a gaseous waste stream.

An apparatus that is equipped to remove vaporized unreacted isocyanate from a gaseous waste stream is shown generally at 10 in FIG. 1. Isocyanate is widely used in the production of polyurethane and other polymers and is typically used in liquid form; however, isocyanate is also useful in gaseous form for some applications. In one embodiment, the apparatus 10 may be used for producing molded polyurethane products, in which case the apparatus 10 may include a mold (not shown) for molding the polyurethane. In another embodiment, the apparatus 10 may be used for making isocyanate. It is to be appreciated that the apparatus 10 may be useful in any process in which isocyanate is involved.

Unreacted isocyanate is a highly volatile chemical and readily vaporizes from compositions that are liquid in form and that include the isocyanate. Vaporized unreacted isocyanates that may be removed from the gaseous waste stream include any component that has an isocyanate group, i.e., an NCO group. Specific vaporized unreacted isocyanates that are contemplated to be removed from the gaseous waste stream include diisocyanates and, in particular, toluene diisocyanates.

The EPA has instituted environmental regulations that stipulate a rate at which isocyanate can be released into ambient atmosphere. For this reason, the apparatus 10 includes a container 12 that defines an interior 14 that is isolated from the ambient atmosphere for receiving the composition including the isocyanate. The vaporized unreacted isocyanate is typically contained within the interior 14 of the container 12 to prevent the vaporized unreacted isocyanate from escaping into the ambient atmosphere.

The container 12 may be any structure that prevents the vaporized unreacted isocyanate from directly escaping into the ambient atmosphere. For example, in one embodiment, the container 12 is further defined as a mold for forming a polyurethane article. More specifically, when the apparatus 10 is used for producing molded polyurethane products in a closed mold, the closed mold itself may be the container 12. In another embodiment, the container 12 may be a room surrounding an open mold that is used for producing the molded polyurethane products. In yet another embodiment, such as in the production of isocyanate itself, the container 12 may be a vat or reaction vessel in which the isocyanate is formed.

A conduit 16 extends from the container 12 and defines a channel 18 therethrough for conveying the vaporized unreacted isocyanate out of the interior 14 of the container 12. More specifically, the interior 14 of the container 12 is in fluid communication with the ambient atmosphere through the channel 18. The vaporized unreacted isocyanate forms part of a gaseous waste stream. The channel 18 conveys the gaseous waste stream out of the container 12 and into the ambient atmosphere. The gaseous waste stream may be formed by actively siphoning the vaporized unreacted isocyanate, as well as any other vaporized components, out of the container 12 through the channel 18 using a blower or compressor. Alternatively, the gaseous waste stream may be formed by passively allowing the vaporized unreacted isocyanate and any other vaporized components to flow out of the container 12 through the channel 18.

The conduit 16, and the channel 18 defined by the conduit 16 through which the gaseous waste stream passes, is to be broadly construed as any structure that forms a pathway through which the gaseous waste stream flows on the way out to the ambient atmosphere. The conduit 16 need not be merely a single continuous tube or duct, but may be a series of tubes or ducts of varying diameter and cross-sectional shape. Furthermore, a variety of different elements may come together to form the conduit 16.

The gaseous waste stream including the vaporized unreacted isocyanate, among other components, is directed through a medium 20 to produce a gaseous product stream, which is substantially free of vaporized unreacted isocyanate. The gaseous product stream is then discharged. The medium 20 is disposed in the channel 18 such that the gaseous waste stream is directed though the medium 20 to product the gaseous product stream prior to discharge. In one embodiment, as illustrated in FIG. 1, the medium 20 may be disposed within a housing 22 that is in series with the flow of the gaseous waste stream through the channel 18. The housing 22 is sealed from the ambient atmosphere, with an inlet 24 for receiving the gaseous waste stream from the channel 18 in one portion of the conduit 16 and an outlet 26 for conveying the gaseous waste stream into the channel 18 in another portion of the conduit 16 and into the ambient atmosphere. As described above, the conduit 16 is to be broadly construed as any structure that forms the channel 18 through which the gaseous waste stream flows on the way out to the ambient atmosphere. In this situation, the housing 22 for the medium 20 is also considered to be part of the conduit 16, with the interior 14 of the housing 22 considered to be part of the channel 18 and the medium 20 disposed in the housing 22.

Figure 3:
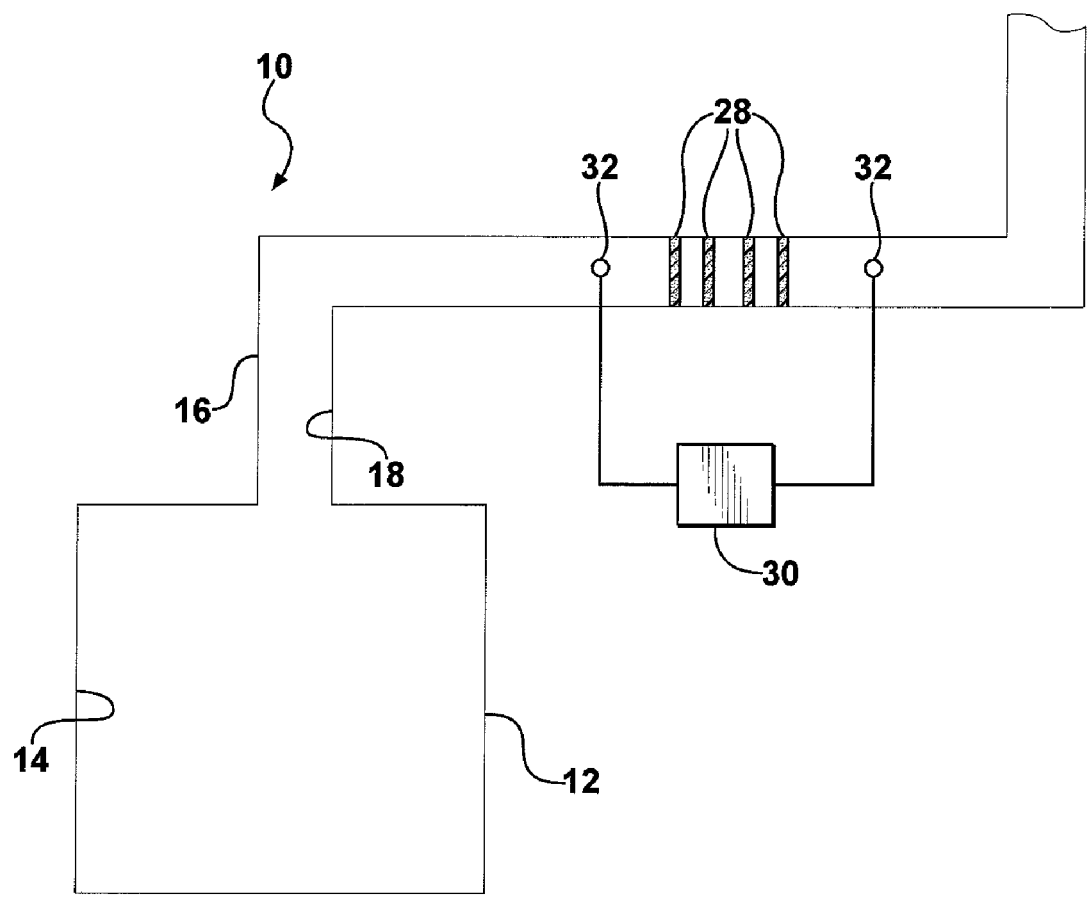
FIG. 3 is a schematic view of another embodiment of the apparatus of the subject invention.

In another embodiment, as shown in FIG. 3, the medium 20 may be disposed in the conduit 16 absent a separate housing 22, i.e., the medium 20 may be placed directly in the conduit 16. It is to be appreciated that a number of factors may control the way the medium 20 is disposed in the conduit 16, such as design considerations, spatial constraints, specific system requirements, etc. In any event, the way the medium 20 is disposed in the channel 18 is immaterial so long as the gaseous waste stream is directed through the medium 20 before discharging.

Figure 2:
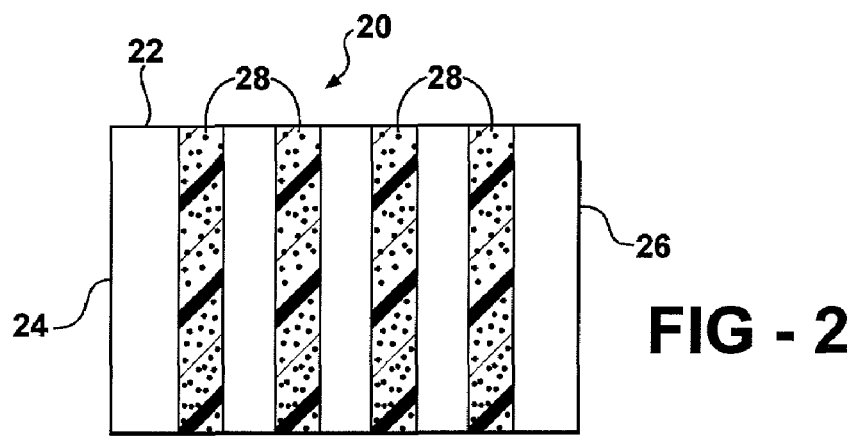
FIG. 2 is a schematic view of a medium used in the apparatus of the subject invention to remove the vaporized unreacted isocyanate from the gaseous waste stream.

The medium 20 includes the reaction product of an isocyanate component and an isocyanate-reactive component such that the medium 20 has free isocyanate-reactive groups for reacting with the vaporized unreacted isocyanate to remove the vaporized unreacted isocyanate from the gaseous waste stream. More specifically, the vaporized unreacted isocyanate in the gaseous waste stream and the free isocyanate-reactive groups in the medium 20 react to produce a gaseous product stream that is substantially free of unreacted isocyanate. Preferably, the medium 20 is formed from porous polyurethane; however, it is to be appreciated that the medium may include the reaction product of the isocyanate component and any isocyanate-reactive component, such as amines. As shown in FIG. 2, the medium 20 typically includes a series of cross-sections 28 formed from the porous polyurethane. In one embodiment, the series of cross-sections 28 may be disposed in the housing 22. In another embodiment, the series of cross-sections 28 may be placed directly in the channel 18. In another embodiment, the medium may be present in the form of polyurethane beads that form a bed in the housing 22.

As set forth above, the medium 20 includes the reaction product of the isocyanate component and the isocyanate-reactive component. To form the medium 20, the isocyanate component and the isocyanate-reactive component, among other components, are combined and reacted together to form polyurethane. In one embodiment, the porous polyurethane is further defined as a polyurethane elastomer, i.e., a non-blown polyurethane. The polyurethane elastomer may be made porous through mechanically punching or forming holes in the elastomer or through chemically degrading the elastomer to form holes in the elastomer. In another embodiment, the porous polyurethane is further defined as a polyurethane foam formed in the presence of a blowing agent. More specifically, the isocyanate component and the isocyanate-reactive component are reacted in the presence of the blowing agent to blow the polyurethane. Specific blowing agents are described in further detail below.

The isocyanate component, for purposes of the subject invention, may be any isocyanate known in the art for forming polyurethane. Examples of suitable isocyanates include toluene diisocyanates, diphenylmethane diisocyanates, polyphenyl polyisocyanates, and combinations thereof. The isocyanate component is typically a toluene diisocyanate. A specific example of a preferred isocyanate for purposes of the subject invention is a mixture of 80 parts by weight of 2,4-toluene diisocyanates and 20 parts by weight 2,6-toluene diisocyanates commercially available from BASF Corporation of Wyandotte, Mich. Specific amounts of the isocyanate component present prior to reaction with the isocyanate-reactive component vary depending upon whether the porous polyurethane is the polyurethane elastomer or the polyurethane foam, or depending on the type of blowing agent that is used. For example, when the polyurethane foam is formed with a chemical blowing agent, an isocyanate index of from 90-120 may be used in order to provide a sufficient amount of isocyanate groups to react with both the isocyanate-reactive component and the blowing agent, while leaving some unreacted isocyanate-reactive groups in the polyurethane foam to react with the vaporized unreacted isocyanate in the gaseous waste stream. In other situations, such as when a physical blowing agent is used, the isocyanate index may be between 100 and 120 in order to leave sufficient isocyanate-reactive groups for reacting with the unreacted isocyanate in the gaseous waste stream. Even when over-indexing is employed, those skilled in the art appreciate that isocyanate-reactive groups still remain in the medium 20. Since the amount of vaporized unreacted isocyanate in the gaseous waste stream is on the magnitude of parts per billion, even residual amounts of isocyanate-reactive groups in the medium 20 may be sufficient to effectively remove the vaporized unreacted isocyanate in the gaseous waste stream.

The isocyanate-reactive component typically includes a molecule that has more than one isocyanate-reactive group, such as a polyol, a polyamine, and the like. One example of a preferred isocyanate-reactive component is a polyol that has at least three isocyanate-reactive functionalities, i.e., three hydroxyl groups. Examples of polyols having at least three hydroxyl groups include glycerine-initiated polyols, trimethylolpropane-initiated polyols, sucrose-initiated polyols, and combinations thereof. It is to be appreciated that isocyanate-reactive components having less than three isocyanate-reactive functionalities may be included with the isocyanate-reactive components that do have at least three isocyanate-reactive functionalities. For example, the isocyanate-reactive component may include a blend of polyols having two isocyanate-reactive functionalities and polyols having three isocyanate-reactive functionalities.

In order to ensure that some free isocyanate-reactive groups remain in the isocyanate-reactive component after reaction with the isocyanate component to form the porous polyurethane, the isocyanate-reactive component may be formulated with an inhibitor package. Such inhibitor packages are known in the art. A specific example of an isocyanate-reactive component formulated with the inhibitor package is Pluracol® 1388 commercially available from BASF Corporation of Wyandotte, Mich.

The porous polyurethane is formed in the presence of a catalyst. Typically, the porous polyurethane is formed in the presence of a number of catalysts that perform different functions. For example, the polyurethane foam is typically formed in the presence of an amine-based catalyst. Amine catalysts including, but not limited to, triethylenediamine, N,N,N'N'-tetramethylhexamethylenediamine, bis(2-dimethylaminoethyl)methyl amine, N-(2-dimethylaminoethyl)-N'-methylpiperazine, N-(2-dimethylaminoethyl)ether, and combinations thereof can be used. In one specific embodiment, the catalyst includes a combination of the bis(dimethylaminoethyl)ether catalyst and triethylenediamine. Depending on the structure of the amine-based catalyst, either a gelling or blowing reaction is favored. By selection of the catalysts, rates for gelling and blowing reactions can be controlled to achieve a desired density of the porous polyurethane when the polyurethane is a foam. Furthermore, the amine-based catalysts provide flee isocyanate-reactive groups in the porous polyurethane, and certain amine-based catalysts promote self reaction of the isocyanate component. As a result, unreacted isocyanate passing through the porous polyurethane may either react with amine groups on the amine-based catalysts, a reaction between unreacted isocyanate molecules may be catalyzed due to the presence of the amine-based catalyst, or a combination of those mechanisms may occur to remove the unreacted isocyanate from the gaseous waste stream. In addition to the amine-based catalysts, metal-based catalysts may also be included in order to promote crosslinking within the porous polyurethane.

The catalyst is typically present in an amount of from 0.05 to 1 parts by weight based on the total weight of all components that are present prior to forming the porous polyurethane. For example, in one embodiment, the total amount of catalyst present is about 0.34 parts by weight based on the total weight of all components that are present prior to forming the porous polyurethane. More specifically, about 0.15 parts by weight of amine-based catalysts and about 0.19 parts by weight of metal-based catalysts are present based on the total weight of all components that are present prior to forming the porous polyurethane.

As set forth above, blowing agents may be present when the porous polyurethane is a polyurethane foam. The blowing agents may be any blowing agent known in the art for blowing polyurethane, and may be chemical blowing agents, physical blowing agents, or a combination of chemical and physical blowing agents. For example, in one embodiment, the blowing agent is water. Water reacts with isocyanate to produce carbon dioxide, which escapes from the polyurethane and blows the polyurethane in the process. In another embodiment, the blowing agent includes a combination of water and liquid carbon dioxide. The liquid carbon dioxide is a physical blowing agent and vaporizes to blow the polyurethane during the reaction between the isocyanate component and the isocyanate-reactive component. Typically, the water is present in an amount of from about 0.5 to about 6 parts by weight based on the total weight of all components that are present prior to forming the porous polyurethane, and the liquid carbon dioxide is present in an amount of from 0.5 to about 10 based on the total weight of all components that are present prior to forming the porous polyurethane. For example, in one embodiment, the water is present in an amount of about 2.5 parts by weight, and the liquid carbon dioxide is present in an amount of about 2.8 parts by weight, both based on the total weight of all components that are present prior to forming the porous polyurethane. Blowing agents present in the amounts specified, with the amount of the catalysts specified above, produce polyurethane foam having a desired density and cell count.

The ultimate goal, in order to maximize the ability of the polyurethane foam to remove the unreacted isocyanate from the gaseous waste stream while allowing freedom in process design, is to maximize surface area of the polyurethane foam while minimizing weight of the polyurethane foam. Typically, the polyurethane foam has a density of less than or equal to 6 lbs/ft$^3$ to minimize a weight of the polyurethane foam. The polyurethane foam also typically has a cell count of from 10 to 100 cells/in, preferably from 20 to 80 cells/in, most preferably from 30 to 70. The density and cell count are all dependent on the blowing agents and the catalysts used to form the polyurethane foam. The cell count is a feature that has an effect on the amount of isocyanate that the polyurethane foam can remove from the gaseous waste stream, since that cell count correlates to a surface area of the polyurethane foam that is exposed to the gaseous waste stream. The cell count also has an effect on process costs. More specifically, a higher cell count correlates to higher pressure drops in the gaseous waste stream over the polyurethane foam. More energy, which correlates to higher process costs, is required to push or draw the gaseous waste stream through polyurethane foam that exhibits higher pressure drops than polyurethane foam having lower pressure drops. The pressure drop across media 20 formed from the polyurethane foam having the cell count specified above is less than or equal to 2 inches of water column, typically about 0.5 inches of water column.

Optionally, a relative humidity of the gaseous waste stream may be adjusted to at least 25 percent, more typically at least 40 percent, prior to the step of directing the gaseous waste stream through the medium. Improved efficiency in the removal of the vaporized unreacted isocyanate results from adjusting the relative humidity of the gaseous waste stream. More specifically, it is known in the art that isocyanate reacts with water. By adjusting the relative humidity of the gaseous waste stream, water is made available to react with the vaporized unreacted isocyanate in the gaseous waste stream to remove a portion of the vaporized unreacted isocyanate from the gaseous waste stream prior to directing the gaseous waste stream through the medium. As such, the vaporized unreacted isocyanate present in the gaseous waste stream may be less concentrated, as compared to when the relative humidity of the gaseous waste stream is not adjusted, and the medium can more effectively remove the vaporized unreacted isocyanate from the gaseous waste stream with the water vapor complimentary to ambient humidity conditions present.

In one embodiment, the medium 20 is exposed to air having a relative humidity of at least 25 percent for a period of at least 24 hours prior to being disposed in said channel 18. More specifically, cross-sections 28 of the polyurethane foam are typically exposed to ambient air at a relative humidity of from 40 to 80 percent, more typically at a relative humidity of about 100 percent, for a period of about 24 hours. As will be shown in the Examples below, media 20 that have been exposed to ambient air remove greater amounts of isocyanate from the gaseous waste stream as compared to media 20 that have not been exposed to ambient air as indicated above. However, it is to be appreciated that exposure to the ambient air is optional and that media 20 that have not been exposed to ambient air are also suitable for purposes of the subject invention.

Typically, the amount of vaporized unreacted isocyanate present in the gaseous waste stream is measured with an ion mobility spectrometer 30. More specifically, the spectrometer 30 includes sensors 32 that are disposed both upstream and downstream of the medium 20 in the channel 18 for measuring the amount of vaporized unreacted isocyanate in the gaseous waste stream. Suitable ion mobility spectrometers are commercially available from Dräger Safety Inc. of Pittsburgh, Pa. The spectrometers are capable of detecting vaporized unreacted isocyanate in the gaseous waste stream down to 2 ppb.

The vaporized unreacted isocyanate is removed from the gaseous waste stream with the medium 20 to produce the gaseous product stream that is substantially free of vaporized unreacted isocyanate. More specifically, by "substantially free", it is meant that the amount of vaporized unreacted isocyanate present in the gaseous product stream is typically reduced to less than or equal to 20 ppb. Preferably, the amount of the vaporized unreacted isocyanate present in the gaseous waste stream is reduced to less than or equal to 2 ppb. It is to be appreciated that a startup time may be required to reduce the vaporized unreacted isocyanate present in the gaseous waste stream below the levels as specified above. Typically, the amount of vaporized unreacted isocyanate present in the gaseous waste stream is reduced to below 20 ppb over a period of less than or equal to 15 minutes, and reduced to less than 2 ppb over a period of less than 7 hours. When the medium 20 is exposed to air having the desired humidity for the desired amount of time, the amount of vaporized unreacted isocyanate present in the gaseous waste stream may be reduced to less than 2 ppb over a period of less than 15 minutes.

The following examples, as presented herein, are intended to illustrate and not limit the invention.

EXAMPLE 1

A test stand is designed for testing the ability of porous polyurethane of the subject invention to remove vaporized unreacted isocyanate, specifically, toluene diisocyanate, from a gaseous waste stream. The test stand includes a conduit that defines a channel. A medium formed from the porous polyurethane is disposed in the channel. More specifically, the medium includes four cross-sections of polyurethane foam that each have a thickness of 0.375 inch. The cross-sections are spaced 6 inches apart from each other in series within the channel, and each cover a full cross section of the channel. The polyurethane foam is formed from the composition set forth in Table 1 below. The amounts shown in Table are in parts by weight based on the total weight of all components that are present prior to forming the polyurethane foam:

TABLE 1

| Component | Parts by Weight |
| --- | --- |
| Isocyanate-Reactive Component | 61.84 |
| Blowing Agent A | 2.55 |
| Blowing Agent B | 2.78 |
| Catalyst A | 0.06 |
| Catalyst B | 0.09 |
| Catalyst C | 0.19 |

TABLE 1-continued

| Component | Parts by Weight |
|---|---|
| Additive A | 0.99 |
| Isocyanate | 31.51 |
| Total | 100.00 |
| Isocyanate Index | 1.05 |
| Density, pcf | 1.09 |
| Resilience, % | 52 |
| Indentation Force Deflection (IDF) at 25% compression, lb/50 in$^2$ | 18 |
| Indentation Force Deflection (IDF) at 65% compression, lb/50 in$^2$ | 35 |
| Indentation Force Deflection (IDF) at 25% compression after decompressing from 65% compression, lb/50 in$^2$ | 13 |
| Support Factor (compression modulus) | 1.93 |
| Compression sets, % set after 90% compression | 3 |
| Air flow, cfm drawn through a 2" × 2" × 1" foam sample at a pressure differential of .5 inches of water column | 8.1 |

Isocyanate-Reactive Component is a polyether triol having a hydroxyl number of about 56 and a nominal number average molecular weight of about 3000 commercially available from BASF Corporation of Wyandotte, Mich.

Blowing Agent A is water.

Blowing Agent B is liquid carbon dioxide.

Catalyst A is 33 wt. % 1,4-diaza-bicyclo[2.2.2]octane in dipropylene glycol commercially available from Air Products and Chemicals, Inc of Allentown, Pa.

Catalyst B is 70 wt. % bisdimethylaminoethyl ether in dipropylene glycol commercially available from Air Products and Chemicals, Inc.

Catalyst C is 50 wt. % stannous octoate in dioctyl phthalate commercially available from Air Products and Chemicals, Inc.

Additive A is Niax® Silicone L-620 surfactant.

Isocyanate is an 80%-20% mixture of 2,4 and 2,6 isomers of toluene diisocyanate commercially available from BASF Corporation.

An ion mobility spectrometer commercially available from Dräger Safety Inc. is used to measure the amount of toluene diisocyanate both upstream and downstream of the medium. More specifically, sensors are disposed both upstream and downstream of the medium in the channel for measuring the amount of toluene diisocyanate in the gaseous waste stream. The spectrometer is capable of detecting toluene diisocyanate in the gaseous waste stream down to 2 ppb.

Figure 4:
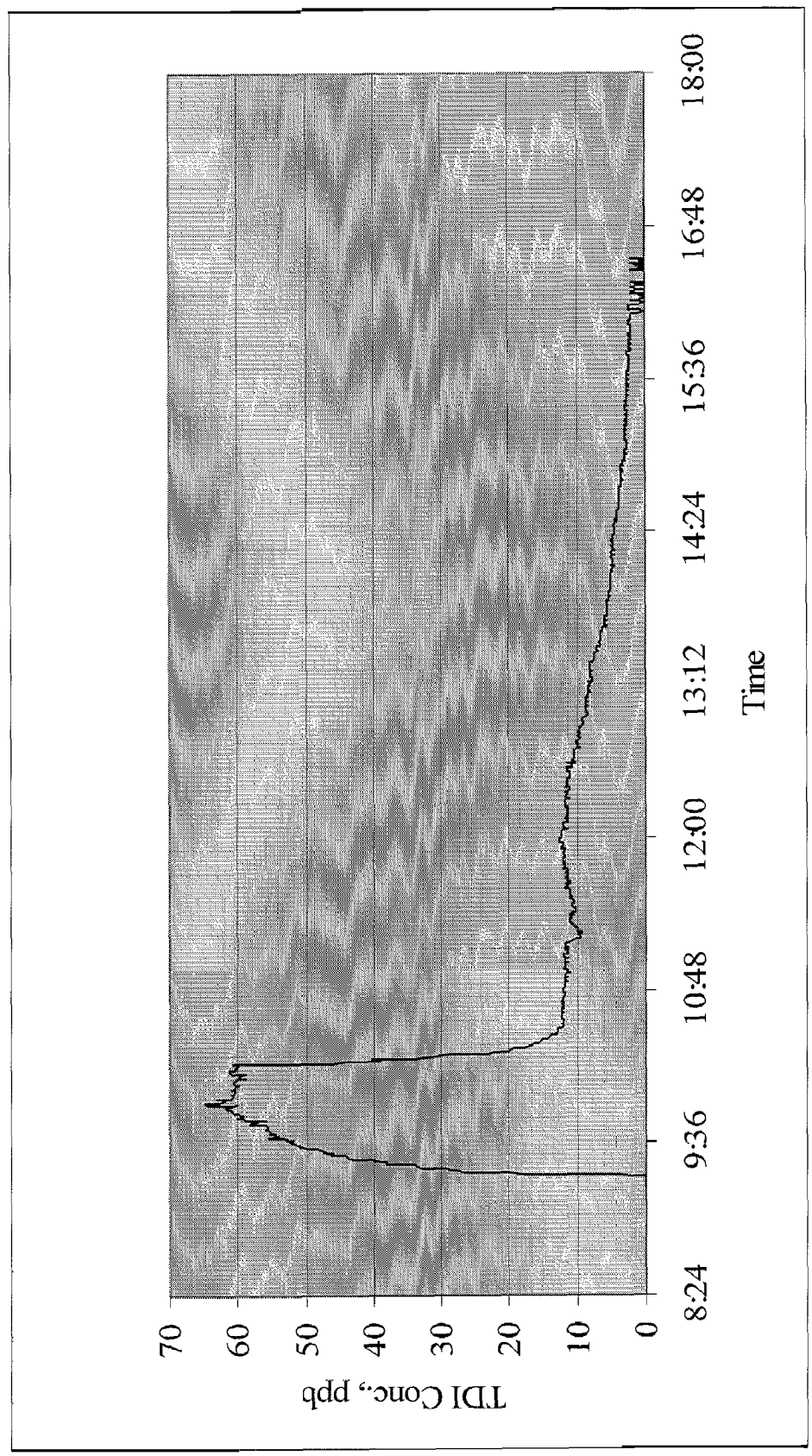
FIG. 4 is a graph showing an amount of TDI removed from the gaseous waste stream by the medium over time.

In this example, the gaseous waste stream includes about 60 ppb toluene diisocyanate at startup. The gaseous waste stream is forced through the medium at a volume of 260 cfm. Referring to FIG. 4, after about 10 minutes, the amount of toluene diisocyanate in the gaseous waste stream is about 12 ppb, about 5 ppb after about 5 hours, and below detectable levels after about 75 hours.

EXAMPLE 2

The same test stand and medium used in Example 1 is used in this example, the difference being that the medium including the four cross-sections of polyurethane foam is exposed to ambient air having a relative humidity of about 45 percent for a period of 24 hours prior to being disposed in the channel.

Figure 5:
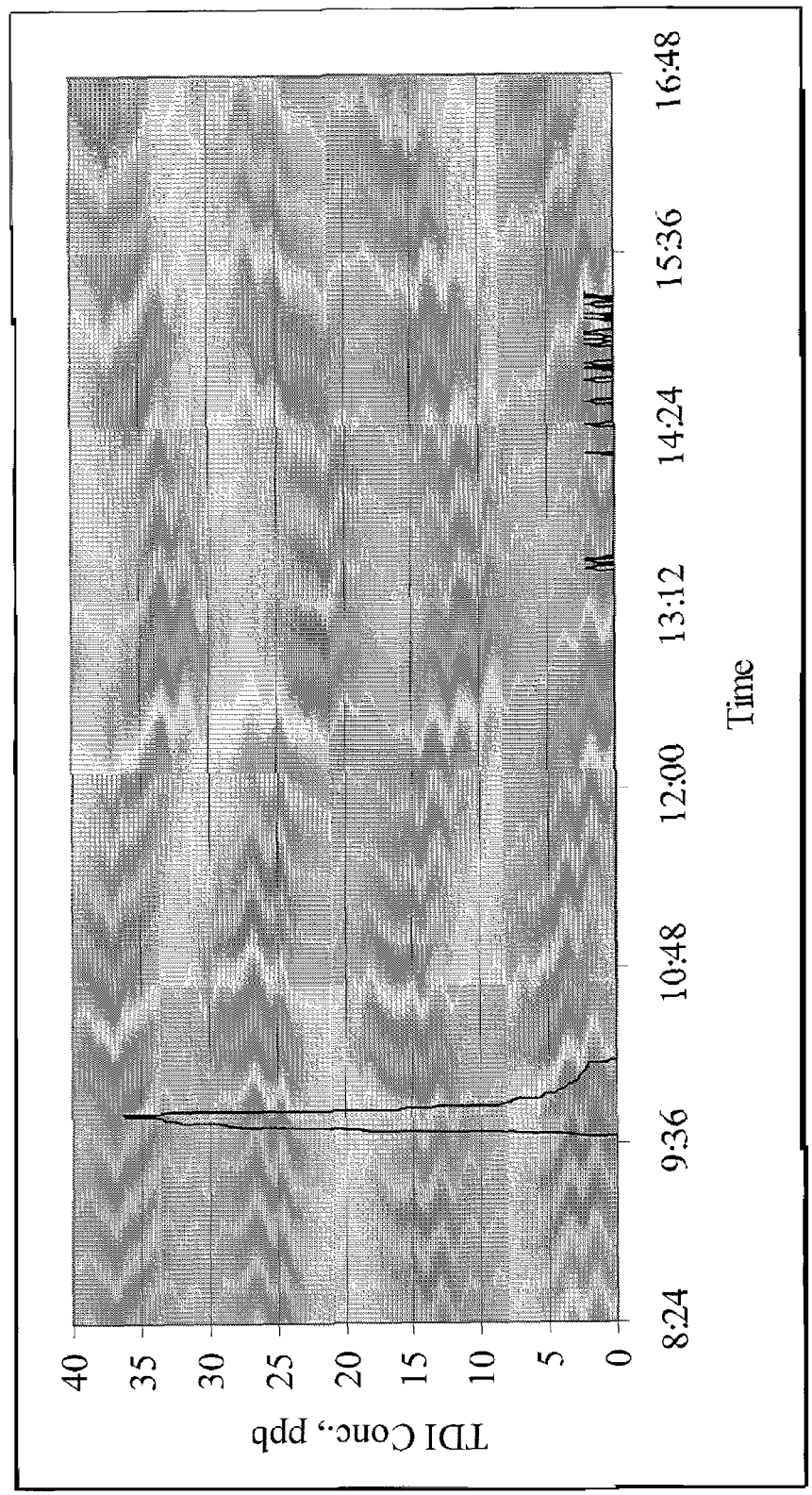
FIG. 5 is a graph showing an amount of TDI removed from the gaseous waste stream by the medium over time after exposing the medium to ambient air having a relative humidity of from 40 to 50 percent for about 24 hours.

In this example, the gaseous waste stream includes about 36 ppb toluene diisocyanate at startup. The gaseous waste stream is forced through the medium at a volume of 260 cfm. Referring to FIG. 5, after about 5 minutes, the amount of toluene diisocyanate in the gaseous waste stream is below detectable levels.

The invention has been described in an illustrative manner, and it is to be understood that the terminology which has been used is intended to be in the nature of words of description rather than of limitation. Obviously, many modifications and variations of the present invention are possible in light of the above teachings, and the invention may be practiced otherwise than as specifically described.

What is claimed is:

1. An apparatus comprising;
   a container defining an interior isolated from ambient atmosphere,
   a conduit extending from said container and defining a channel therethrough with said interior of said container in fluid communication with the ambient atmosphere through said channel, and
   a medium disposed in said channel and comprising the reaction product of an isocyanate component and an isocyanate-reactive component in the presence of a catalyst with said medium having free isocyanate-reactive groups.

2. An apparatus as set forth in claim 1 wherein said medium is formed from porous polyurethane.

3. An apparatus as set forth in claim 2 wherein said medium comprises a series of cross-sections formed from said porous polyurethane and disposed in said channel.

4. An apparatus as set forth in claim 2 wherein said porous polyurethane is further defined as a polyurethane elastomer.

5. An apparatus as set forth in claim 2 wherein said porous polyurethane is further defined as a polyurethane foam formed in the presence of a blowing agent.

6. An apparatus as set forth in claim 5 wherein said blowing agent comprises water.

7. An apparatus as set forth in claim 6 wherein the polyurethane foam has a density of less than or equal to 6 lbs/ft$^3$ and a cell count of from 10 to 100 cells/in.

8. An apparatus as set forth in claim 7 wherein said blowing agent further comprises carbon dioxide.

9. An apparatus as set forth in claim 1 wherein said isocyanate-reactive component comprises a polyol having at least three isocyanate-reactive functionalities.

10. An apparatus as set forth in claim 9 wherein the isocyanate-reactive component is formulated with an inhibitor package.

11. An apparatus as set forth in claim 1 wherein said catalyst comprises an amine-based catalyst.

12. An apparatus as set forth in claim 1 wherein said medium is exposed to air having a relative humidity of at least 25 percent for a period of at least 24 hours prior to being disposed in said channel.

13. An apparatus as set forth in claim 1 further comprising sensors disposed both upstream and downstream of said medium in said channel for measuring an amount of vaporized unreacted isocyanate in the gaseous waste stream.

14. An apparatus as set forth in claim 1 wherein said container is further defined as a mold for forming a polyurethane article.

15. A method of removing vaporized unreacted isocyanate from a gaseous stream, said method comprising the steps of;
   providing a gaseous waste stream including vaporized unreacted isocyanate in a container defining an interior isolated from ambient atmosphere,
   directing the gaseous waste stream including the vaporized unreacted isocyanate through a medium comprising the reaction product of an isocyanate component and an isocyanate-reactive component in the presence of a catalyst with the medium having free isocyanate-reactive groups;

reacting the vaporized unreacted isocyanate and free isocyanate-reactive groups to produce a gaseous product stream substantially free of unreacted isocyanate; and discharging the gaseous product stream substantially free of unreacted isocyanate.

16. A method as set forth in claim 15 wherein the vaporized unreacted isocyanate is further defined as toluene diisocyanate.

17. A method as set forth in claim 15 wherein the step of reacting the vaporized unreacted isocyanate comprises reducing an amount of vaporized unreacted isocyanate present in the gaseous waste stream to less than or equal to 20 ppb.

18. A method as set forth in claim 15 wherein the isocyanate-reactive component comprises a polyol having at least three isocyanate-reactive functionalities.

19. A method as set forth in claim 18 wherein the polyol is formulated with an inhibitor package.

20. A method as set forth in claim 15 wherein the catalyst comprises an amine-based catalyst.

21. A method as set forth in claim 15 wherein the medium is formed from a porous polyurethane.

22. A method as set forth in claim 21 wherein the medium comprises a series of cross-sections formed from the porous polyurethane.

23. A method as set forth in claim 21 wherein the porous polyurethane is further defined as a porous elastomer.

24. A method as set forth in claim 21 wherein the porous polyurethane is further defined as a polyurethane foam formed in the presence of a blowing agent.

25. A method as set forth in claim 24 wherein the blowing agent comprises water.

26. A method as set forth in claim 25 wherein the polyurethane foam has a density of less than or equal to 6 lbs/ft$^3$ and a cell count of from 10 to 100 cells/in.

27. A method as set forth in claim 26 wherein the blowing agent further comprises carbon dioxide.

28. A method as set forth in claim 26 wherein a pressure drop across the medium is less than or equal to 2 inches of water column.

29. A method as set forth in claim 15 further comprising the step of exposing the medium to air having a relative humidity of at least 25 percent for a period of at least 24 hours.

30. A method as set forth in claim 29 wherein the step of reacting the vaporized unreacted isocyanate comprises reducing the amount of the vaporized unreacted isocyanate present in the gaseous waste stream to less than or equal to 2 ppb.

31. A method as set forth in claim 30 further comprising the step of measuring the amount of vaporized unreacted isocyanate present in the gaseous waste stream with an ion mobility spectrometer.

32. A method as set forth in claim 15 further comprising the step of adjusting a relative humidity of the gaseous waste stream to at least 25 percent prior to the step of directing the gaseous waste stream through the medium.

* * * * *